3,207,763
N-AMINOPYRAZOLES
Robert J. Harder, Wilmington, Del., assignor to E. I. du Pont de Nemours and Company, Wilmington, Del., a corporation of Delaware
No Drawing. Filed Aug. 15, 1963, Ser. No. 302,441
9 Claims. (Cl. 260—310)

This invention relates to a new class of N-aminopyrazoles.

The new products of this invention can be described by the following structural formula:

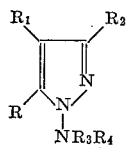

wherein R, $R_1$, and $R_2$ can be alike or different and specifically include hydrogen, monovalent lower (1–6 carbon) alkyl hydrocarbon, monovalent monocyclic aromatic hydrocarbon, halogen of atomic number 9–53 inclusive, nitro, and cyano and when taken pairwise on adjoining ring carbons of the pyrazole nucleus, can form with said ring carbons a fused monocyclic aromatic structure, with the proviso that at most two of R, $R_1$, and $R_2$ can at the same time be lower alkyl and monocyclic aromatic hydrocarbon, as just defined, and then only R and $R_1$ or $R_1$ and $R_2$, and with the further proviso that when at least two or R, $R_1$, and $R_2$ are halogen, as defined above, nitro, or cyano, the third member of the group can be amino, and $R_3$ and $R_4$ represent hydrogen or lower alkanoyl.

The N-aminopyrazoles of this invention are prepared by reacting the requisite pyrazoles in accord with the requirements of R, $R_1$, and $R_2$ with hydroxylamine-O-sulfonic acid under basic conditions in either aqueous, aqueous/organic, or solely organic reaction media at temperatures in the range generally of 0–100° C. for reaction times of 10 minutes to 24 hours. Preferred conditions comprise using aqueous basic media, most conveniently sodium hydroxide, at room temperature to 100° C. Any aqueous-soluble strong base can be used, e.g., the alkali metal and alkaline earth metal hydrides, hydroxides, and the like. When the reaction medium is wholly organic or predominantly organic, the base must be organic-soluble, e.g., the alkali metal alkoxides and the like.

When $R_3$ and/or $R_4$ in the structural formula shown above are lower alkanoyl, the requisite pyrazole as per the necessities of R, $R_1$, and $R_2$, is first condensed with hydroxylamine-O-sulfonic acid, and the resultant 1-aminopyrazole is then reacted with the necessary carboxylic acid anhydride or acid halide. This two step reaction process may be illustrated by the following equation:

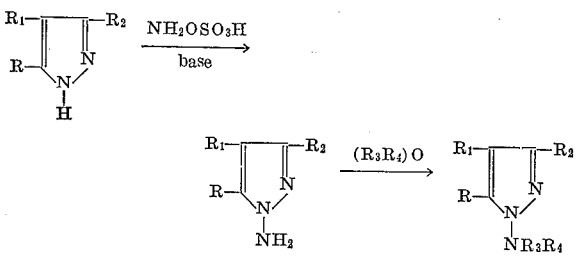

wherein R, $R_1$, and $R_2$ are as described above and $R_3$ and $R_4$ are lower alkanoyl radicals.

The invention is illustrated in further detail by the following examples, in which the parts are by weight.

EXAMPLE I

To a solution of 10.2 parts of 4-chloropyrazole in 226 parts of 1-N aqueous sodium hydroxide at room temperature was added 11.3 parts of hydroxylamine-O-sulfonic acid. The resultant clear solution was warmed at steam bath temperatures for 15 minutes, heated to 100° C., held there for ten minutes, and two more parts of hydroxylamine-O-sulfonic acid was then added. The resultant reaction mixture was cooled to 5° C., and about 200 parts of a saturated aqueous sodium chloride solution and 20 parts of aqueous 1-N sodium hydroxide solution were added. The resultant clear solution was extracted with three 70 part portions of diethyl ether. The ether extracts were combined, dired over anhydrous sodium sulfate, and the diethyl ether solvent evaporated therefrom on a steam bath. The resultant residual oil (8.5 parts) crystallized on cooling. Recrystallization of the solid from low-boiling petroleum ether afforded 6.0 parts (51% of theory) of 1-amino-4-chloropyrazole melting at 65.0–66.5° C. A second recrystallization from a diethyl ether/petroleum ether mixture afforded purified 1-amino-4-chloropyrazole melting at 67–68° C.

Analysis.—Calcd. for $C_3H_4ClN_3$: C, 30.6%; H, 3.4%; Cl, 30.2%; N, 35.8%. Found: C, 30.5%; H, 3.7%; Cl, 29.6%; N, 36.1%.

EXAMPLE II

To a room-temperature suspension of 25.6 parts of 4-nitropyrazole in about 600 parts of 1-N aqueous sodium hydroxide solution was added all at once 34.0 parts of hydroxylamine-O-sulfonic acid resulting in a clear, deep yellow reaction mixture exhibiting a reaction temperature of 45° C. The reaction mixture was allowed to stand for 12 hours, at which point the pH had dropped to 9. The yellow needle solid product was removed by filtration, washed with water, and air-dried. There was thus obtained 3.8 parts of 1-amino-4-nitropyrazole as yellow needles melting at 99–101° C. On recrystallization from diethyl ether, the purified product (1.1 parts) was obtained as pale yellow prisms melting at 100–101° C.

Analysis.—Calcd. for $C_3H_4N_4O_2$: C, 28.2%; H, 3.2%; N, 43.8%. Found: C, 28.6%; H, 3.0%; N, 43.4%.

EXAMPLE III

To about 600 parts of 1-N aqueous sodium hydroxide was added, with stirring, 61 parts of 3,4,5-tribromopyrazole and 34 parts of hydroxylamine-O-sulfonic acid. After about five minutes, the reaction mixture was filtered and the filtrate was allowed to stand for 12 hours at ambient temperature. The resultant solid was collected and air-dried. There was thus obtained 32 parts of crude 1-amino-3,4,5-tribromopyrazole melting at 105–115° C. After recrystallization from diethyl ether, the product was obtained as colorless crystals melting at 127.0–128.0° C.

Analysis.—Calcd. for $C_3H_2Br_3N_3$: C, 11.3%; H, 0.6%; Br, 75.0%; N, 13.1%. Found: C, 11.2%; H, 0.6%; Br, 73.4%; N, 13.7%.

EXAMPLE IV

A solution of 6.0 parts of 1-amino-4-chloropyrazole in about 22 parts of acetic anhydride was refluxed for 7¼ hours. The reaction mixture was allowed to stand overnight at room temperature, and the acetic acid and unreacted acetic anhydride were removed by distillation at atmospheric pressure. On cooling the residual oil, there was thus obtained 9.75 parts of crude 1-bis(acetyl)amino-4-chloropyrazole as crystals melting at 60–62° C. On recrystallization from diethyl ether, there was thus obtained 5.38 parts of the pure product as colorless crystals melting at 72–73° C.

*Analysis.*—Calcd. for $C_7H_8ClN_3O_2$: C, 41.7%; H, 4.0%; Cl, 17.6%; N, 20.8%. Found: C, 41.7%; H, 4.0%; Cl, 17.9%; N, 20.5%.

EXAMPLE V

To a suspension of 4.5 parts of indazole in about 90 parts of 1-N aqueous sodium hydroxide solution at room temperature was added 5.5 parts of hydroxylamine-O-sulfonic acid. The temperature of the reaction mixture rose spontaneously to 35° C. The reaction mixture was heated to approximately 100° C. for a few minutes and then held at about 80° C. until the pH of the reaction mixture reached 7.5–8.0. About 8.0 parts of 1-N aqueous sodium hydroxide solution and 2.75 parts of hydroxylamine-O-sulfonic acid were then added. The reaction mixture was heated at steam bath temperatures until the pH thereof reached 7.0. Unreacted indazole (1.7 parts) was recovered by filtration. On cooling the filtrate, there was thus obtained 1.6 parts of additional starting material. The decanted liquid from the filtrate was cooled to 0° C. and the resulting solid removed by filtration. There was thus obtained 0.2 part of 1- and/or 2-aminoindazole.

EXAMPLE VI

To a solution of 34 parts of pyrazole in about 1130 parts of aqueous 1-N sodium hydroxide solution at 30° C. was added 65 parts of hydroxylamine-O-sulfonic acid. The resulting solution was heated to boiling for ten minutes and two additional parts of hydroxylamine-O-sulfonic acid was then added and the solution allowed to cool to room temperature. The reaction mixture was extracted with three about 70 part portions of diethyl ether, from which extracts on evaporation there was obtained 15 parts of mixed oil and crystals which ultimately reduced to five parts of recovered starting pyrazole. The aqueous layer from the extracted reaction mixture was treated with 300 parts of sodium chloride and about 30 parts of aqueous 70% sodium hydroxide solution. The thus treated aqueous fraction was then again extracted with three about 70 part portions of diethyl ether. The ether extracts were combined, dried over anhydrous sodium sulfate, and the diethyl ether solvent removed therefrom by evaporation at room temperature. There was thus obtained seven parts of a mixture of oil and crystals as crude 1-aminopyrazole.

EXAMPLE VII

To a solution of 40 parts of 3-amino-4,5-dicyanopyrazole in 300 parts of 10% aqueous sodium hydroxide solution was added 44 parts of hydroxylamine-O-sulfonic acid. The resultant reaction mixture became hot, and on external cooling, a crystalline product separated. On filtration followed by drying, there was thus obtained 14 parts of 1,5-diamino-3,4-dicyanopyrazole. After recrystallization from water, the pure product melted at 224–225° C.

*Analysis.*—Calcd. for $C_5H_5N_6$: C, 40.5%; H, 2.7%; N, 56.7%. Found: C, 40.6%; H, 2.7%; N, 56.2%.

EXAMPLE VIII

To a suspension of 15 parts of 4-methylpyrazole in about 245 parts of aqueous 20% sodium hydroxide solution was added at 55–75° C. 42 parts (roughly two molar proportions based on the pyrazole) of hydroxylamine-O-sulfonic acid. The mixture was allowed to cool spontaneously and let stand at room temperature for 60 hours. The reaction mixture was then extracted three times with diethyl ether, the ether extracts combined, dried, and the ether solvent removed therefrom by evaporation at room temperature. There was thus obtained 14.8 parts of crude 1-amino-4-methylpyrazole as a yellow residual oil. This was refluxed with about 65 parts of acetic anhydride for five hours. The excess acetic anhydride and resultant acetic acid were removed by distillation under a pressure corresponding to 1 mm. of mercury, thereby affording crude 1-(diacetylamino)-4-methylpyrazole as a crystalline residue melting at 45–48° C. On recrystallization from a diethyl ether/petroleum ether mixture, the purified 1-(diacetylamino)-4-methylpyrazole was obtained as crystals melting at 49.0–50.5° C.

*Analysis.*—Calcd. for $C_8H_{11}N_3O_2$: C, 53.0%; H, 6.1%; N, 23.2%. Found: C, 53.5%, 53.8%; H, 6.1%, 6.3%; N, 23.6%, 23.7%, 24.0%.

The new compounds of this invention are generically useful as chemical reducing agents, especially in aqueous systems, and are particularly useful in aqueous reduction of metallic ions to the free metals, e.g., $Ag^+ \rightarrow Ag^\circ$. The generic utility of these new aminopyrazoles as chemical reducing agents is illustrated in the following table, which shows successful reduction of Tollen's reagent to form silver mirrors with the indicated specific aminopyrazoles of the foregoing detailed examples. Tollen's reagent was prepared according to the directions given in Shriner and Fuson, "Identification of Organic Compounds," 3rd edition, John Wiley and Sons, Inc., New York, N.Y., 1948, page 145. Aqueous solutions or suspension-solutions of the following 1-aminopyrazoles were added to separate aliquots of the Tollen's reagent at room temperature:

*Table I*

| | Example | Remarks |
|---|---|---|
| (1) 1-aminopyrazole | VI | A white precipitate formed. The mixture was warmed briefly, whereupon a silver mirror formed. |
| (2) 1-amino-4-chloropyrazole | I | A silver mirror formed at room temperature. |
| (3) 1-amino-4-nitropyrazole | II | An orange precipitate formed. Warming gently gave a silver mirror. |
| (4) 1-amino-3,4,5-tribromopyrazole | III | Warming briefly gave a silver mirror. |
| (5) 1,5-diamino-3,4-dicyanopyrazole | VII | Silver mirror formed. |

The following table shows that substitution of the indicated different reactants for the reactants of the previously disclosed, fully detailed examples will result in the formation of the indicated different products, all of which are within the scope of the present invention.

Table II

| | Variants | |
|---|---|---|
| 4-bromopyrazole | 4 to 20% NaOH / NH₂OSO₃H | 1-amino-4-bromopyrazole |
| 4-iodopyrazole | 4 to 20% NaOH / NH₂OSO₃H | 1-amino-4-iodopyrazole |
| 3(5),4-dibromopyrazole | 4 to 20% NaOH / NH₂OSO₃H | 1-amino-3,4-dibromopyrazole +1-amino-4,5-dibromopyrazole |
| 3(5),4-diiodopyrazole | 4 to 20% NaOH / NH₂OSO₃H | 1-amino-3,4-diiodopyrazole +1-amino-4,5-diiodopyrazole |
| 3,5-dibromopyrazole | 4 to 20% NaOH / NH₂OSO₃H | 1-amino-3,5-dibromopyrazole |
| 3(5)-chloro-4-nitropyrazole | 4 to 20% NaOH / NH₂OSO₃H | 1-amino-3-chloro-4-nitropyrazole +1-amino-5-chloro-4-nitropyrazole |
| 3,5-dibromo-4-nitropyrazole | 4 to 20% NaOH / NH₂OSO₃H | 1-amino-3,5-dibromo-4-nitropyrazole |
| 4-cyanopyrazole | 4 to 20% NaOH / NH₂OSO₃H | 1-amino-4-cyanopyrazole |
| 3,4,5-tricyanopyrazole | 4 to 20% NaOH / NH₂OSO₃H | 1-amino-3,4,5-tricyanopyrazole |
| 3(5)-phenylpyrazole | 4 to 20% NaOH / NH₂OSO₃H | 1-amino-3-phenylpyrazole +1-amino-5-phenylpyrazole |
| 4-phenylpyrazole | 4 to 20% NaOH / NH₂OSO₃H | 1-amino-4-phenylpyrazole |
| 3(5),4-diphenylpyrazole | 4 to 20% NaOH / NH₂OSO₃H | 1-amino-3,4-diphenylpyrazole +1-amino-4,5-diphenylpyrazole |
| 3(5)-bromo-4-phenylpyrazole | 4 to 20% NaOH / NH₂OSO₃H | 1-amino-3-bromo-4-phenylpyrazole +1-amino-5-bromo-4-phenylpyrazole |
| 3,5-dibromo-4-phenylpyrazole | 4 to 20% NaOH / NH₂OSO₃H | 1-amino-3,5-dibromo-4-phenylpyrazole |
| 4-bromo-3(5)-chloro-5(3)-pehnylpyrazole | 4 to 20% NaOH / NH₂OSO₃H | 1-amino-4-bromo-3-chloro-5-phenylpyrazole +1-amino-4-bromo-5-chloro-3-phenylpyrazole |
| 3(5)-nitro-4-phenylpyrazole | 4 to 20% NaOH / NH₂OSO₃H | 1-amino-3-nitro-4-phenylpyrazole +1-amino-5-nitro-4-phenylpyrazole |

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. An N-aminopyrazole of the formula

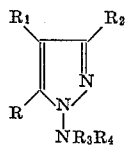

wherein R, $R_1$, and $R_2$ are selected from the group consisting of hydrogen, lower alkyl, monovalent monocyclic aromatic hydrocarbon, halogen of atomic number 9 to 53 inclusive, nitro, and cyano, and when taken pairwise on adjoining ring carbons of the pyrazole nucleus, can form with said ring carbons a fused monocyclic aromatic structure, with the provisos that, first, at most two of R, $R_1$, and $R_2$ can at the same time be lower alkyl and monocyclic aromatic hydrocarbon, as just defined, and then only the pairs R and $R_1$ and $R_1$ and $R_2$, and second, when at least two of R, $R_1$, and $R_2$ are selected from the group consisting of halogen, as defined above, nitro, and cyano, the third member of the group can be amino, and $R_3$ and $R_4$ are selected from the group consisting of hydrogen and lower alkanoyl.

2. 1-amino-4-chloropyrazole.
3. 1-amino-4-nitropyrazole.
4. 1-amino-3,4,5-tribromopyrazole.
5. 1-bis(acetyl)amino-4-chloropyrazole.
6. 1-aminopyrazole.
7. 1,5-diamino-3,4-dicyanopyrazole.
8. 1-amino-4-methylpyrazole.
9. 1-diacetylamino-4-methylpyrazole.

References Cited by the Examiner

UNITED STATES PATENTS 3,029,236   4/62   Staeuble et al. _____ 260—249.5

OTHER REFERENCES

Conant: The Chemistry of Organic Compounds, 3rd ed., pages 189–190, N.Y., Macmillan, 1947.

Gosl et al.: Chemische Berichte, vol. 92, pages 2521–31 (1959).

Huttel et al.: Chemische Berichte, vol. 88, pages 1586–90 (1955).

Migrdichian: Organic Synthesis, vol. 1, pages 483–84, N.Y., Reinhold, 1957.

WALTER A. MODANCE, *Primary Examiner.*

NICHOLAS S. RIZZO, *Examiner.*